US008639864B1

(12) United States Patent
Sullivan et al.

(10) Patent No.: US 8,639,864 B1
(45) Date of Patent: Jan. 28, 2014

(54) METHOD AND SYSTEM FOR FACILITATING COMMUNICATION BETWEEN A HOST AND DOWNSTREAM DEVICES IN A DATA STORAGE SYSTEM

(75) Inventors: Douglas R. Sullivan, Hopkinton, MA (US); Howard G. Drake, Westborough, MA (US); Matthew Yellen, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 1227 days.

(21) Appl. No.: 11/171,841

(22) Filed: Jun. 30, 2005

(51) Int. Cl.
    *G06F 13/14* (2006.01)
(52) U.S. Cl.
    USPC .............................................. 710/72; 710/36
(58) Field of Classification Search
    USPC ............... 379/93; 709/217, 230; 710/29, 110, 710/305, 317, 5, 6, 8; 711/114; 714/37, 4, 714/48, 6
    See application file for complete search history.

(56) References Cited

U.S. PATENT DOCUMENTS

| | | | | |
|---|---|---|---|---|
| 4,511,886 A | * | 4/1985 | Rodriguez | 340/534 |
| 5,438,614 A | * | 8/1995 | Rozman et al. | 379/93.08 |
| 5,737,744 A | * | 4/1998 | Callison et al. | 711/114 |
| 5,758,118 A | * | 5/1998 | Choy et al. | 711/114 |
| 5,787,256 A | * | 7/1998 | Marik et al. | 709/238 |
| 5,901,151 A | * | 5/1999 | Bleiweiss et al. | 370/480 |
| 6,098,114 A | * | 8/2000 | McDonald et al. | 710/5 |
| 6,138,176 A | * | 10/2000 | McDonald et al. | 710/6 |
| 6,185,697 B1 | * | 2/2001 | Shiraishi | 714/6 |
| 6,404,861 B1 | * | 6/2002 | Cohen et al. | 379/93.01 |
| 6,798,784 B2 | * | 9/2004 | Dove et al. | 370/463 |
| 6,845,410 B1 | * | 1/2005 | Brown et al. | 710/29 |
| 6,857,035 B1 | * | 2/2005 | Pritchard et al. | 710/110 |
| 7,908,625 B2 | * | 3/2011 | Robertson et al. | 725/82 |
| 2002/0068558 A1 | * | 6/2002 | Janik | 455/422 |
| 2004/0198237 A1 | * | 10/2004 | Abutaleb et al. | 455/78 |
| 2006/0168358 A1 | * | 7/2006 | Liang et al. | 710/8 |

OTHER PUBLICATIONS

Wolf, Computers as Components, 2001Morgan Kaufman, pp. 455 and 477.*
Chaney et al., THe Design and Implementation of a RAID-2 Multimedia File Server, 1995, ACM, pp. 1-12.*

* cited by examiner

*Primary Examiner* — Cheng-Yuan Tseng
(74) *Attorney, Agent, or Firm* — Krishnendu Gupta; Konrad R. Lee

(57) ABSTRACT

A diplex FPGA is utilized to fan out a single high speed host universal asynchronous receiver transmitter ("UART") channel into a number of diplex UART channels. The diplex FPGA includes a microprocessor, memory, a host UART and a number of diplex UARTs. In operation, the microprocessor polls each of the UARTs in a "round robin" manner and accepts packets from the host UART for transmission downstream and from the diplex UARTs for transmission upstream.

13 Claims, 3 Drawing Sheets

METHOD AND SYSTEM FOR FACILITATING COMMUNICATION BETWEEN A HOST AND DOWNSTREAM DEVICES IN A DATA STORAGE SYSTEM

FIELD OF THE INVENTION

This invention relates generally to the field of storage and more particularly to a method and apparatus for facilitating communication between a host and downstream devices in a data storage system.

BACKGROUND OF THE INVENTION

Subsystems comprising disk arrays, i.e., groups of small, independent disk drive modules used to store large quantities of data have been developed and found to possess many advantages over a single large disk drive. For example, the individual modules of a disk array typically take up very little space and typically use less power and cost less than a single large disk drive, yet, when grouped together in an array, provide the same data storage capacity as a single large disk drive. In addition, the small disks of an array retrieve data more quickly than does a single large disk drive because, with a small disk drive, there is less distance for the actuator to travel and less data per individual disk to search through. The greatest advantage to small disk drives, however, is the boost they give to I/O performance when configured as a disk array subsystem. A disk array is typically housed in a chassis, which may be an enclosure, for holding a plurality of disk drives. When additional memory storage space is required, additional disk array chassis may be added to the existing system.

SUMMARY OF THE INVENTION

In accordance with an embodiment of the present invention, a dynamically upgradeable disk array chassis includes a chassis that contains the disk drives. The disk drives and a disk controller are connected in a loop with a first serial bus for transmitting data from the controller and a second serial bus for passing data back to the controller. The disk drives are connected to one or the other of the serial busses. A shunt is connected to the first and second busses at the end opposite the controller and has a normal state in which the first bus is connected to the second bus thus completing the loop. The shunt may also assume a state in which each of the first and second serial busses are connected to separate outputs. The separate outputs are used to connect to a new disk array chassis with similar busses and shunting device. Each chassis has an environmental monitor that controls the state of its shunt. A separate serial communication bus connects to the monitor. When a new disk array chassis is connected to the existing chassis, the existing chassis's environmental monitor may communicate through its serial communication bus with the serial communication bus and environmental monitor on the new disk array chassis to determine whether conditions are suitable for extending the disk drive loop to include the disks on the new disk array chassis. If no faults are detected, the existing chassis's environmental monitor switches its shunt to connect the disk drive serial busses of the existing disk array chassis to those of the new disk array chassis. The new chassis's environmental monitor leaves its shunt in the normal state to connect the two disk drive busses and the disk drive loop is again complete.

In accordance with an embodiment of the invention, diplexing is used to provide the path for the serial communication bus to the environmental monitor, and the signals for the disk drive loop over the same wires of a single cable connecting the disk array chassis to one another. Preferably, low frequency signals are used for the communication with the environmental monitor and high frequency signals are used for disk drive loop communications including I/O operations. The low frequency signals may be similar to those of the RS-232 serial data protocol and the high frequency signals may adopt the Fibre Channel Arbitrated Loop signal protocol. The Fibre Channel 8B/10B signal encoding advantageously guarantees frequent transitions on the Fibre Channel signal so that the signal can always be distinguished from the low frequency signals. The Fibre Channel encoding keeps the frequency content of the Fibre Channel signal isolated to 100 MHZ and above by guaranteeing a transition at least every 5 bits. A preferred method of diplexing the low frequency serial signals and the high frequency I/O signals is described in U.S. Pat. No. 5,901,151 ("the '151 patent"), commonly owned by the assignee of the present invention, which patent is hereby incorporated by reference in its entirety.

The present invention is directed to a diplex FPGA which is utilized to fan out a single high speed host universal asynchronous receiver transmitter ("UART") channel into a number of diplex UART channels. The diplex FPGA includes a microprocessor, memory, a host UART and a number of diplex UARTs. In operation, the microprocessor polls each of the UARTs in a "round robin" manner and accepts packets from the host UART for transmission downstream and from the diplex UARTs for transmission upstream. This enables the host UART to operate at a high speed, such as 115,200 baud, while the diplex UARTs operate at a much lower speed, such as 9,600 baud or 19,200 baud. The signal output from each of the diplex UARTs is diplexed with a Fibre Channel communication signal that is output to a Fibre Channel loop of the storage array to which the diplex FPGA is coupled.

BRIEF DESCRIPTION OF THE DRAWINGS

These and other features of the invention will become more readily apparent from the following detailed description when read together with the accompanying drawings, in which.

DETAILED DESCRIPTION

Figure 1:
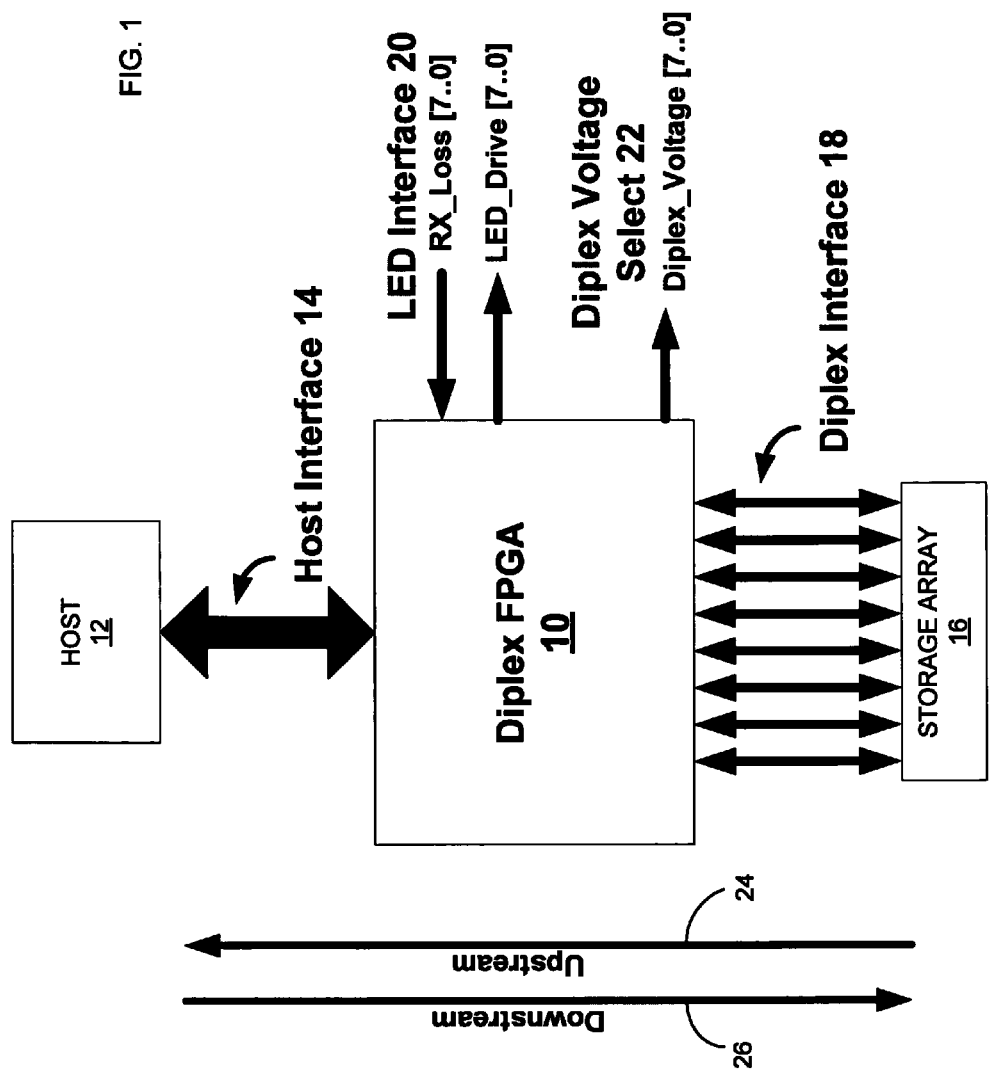
FIG. 1 is a schematic block diagram of the interfaces associated with the diplex FPGA of the present invention.

FIG. 1 is a schematic block diagram showing the diplex FPGA 10 of the present invention and the interfaces with which the diplex FPGA 10 communicates. As shown in FIG. 1 and described in detail below, diplex FPGA 10 communicates with the host 12 over host interface 14 and with a storage array 16 over diplex interface 18. The diplex FPGA 10 also outputs an LED drive signal and receives a receiver loss signal over an LED interface 20 and outputs a diplex voltage select signal over a diplex voltage select interface 22. For the purposes of the description of the diplex FPGA 10, the upstream direction shall be the direction indicated by arrow 24 in FIG. 1 and the downstream direction shall be the direction indicated by arrow 26.

Figure 2:
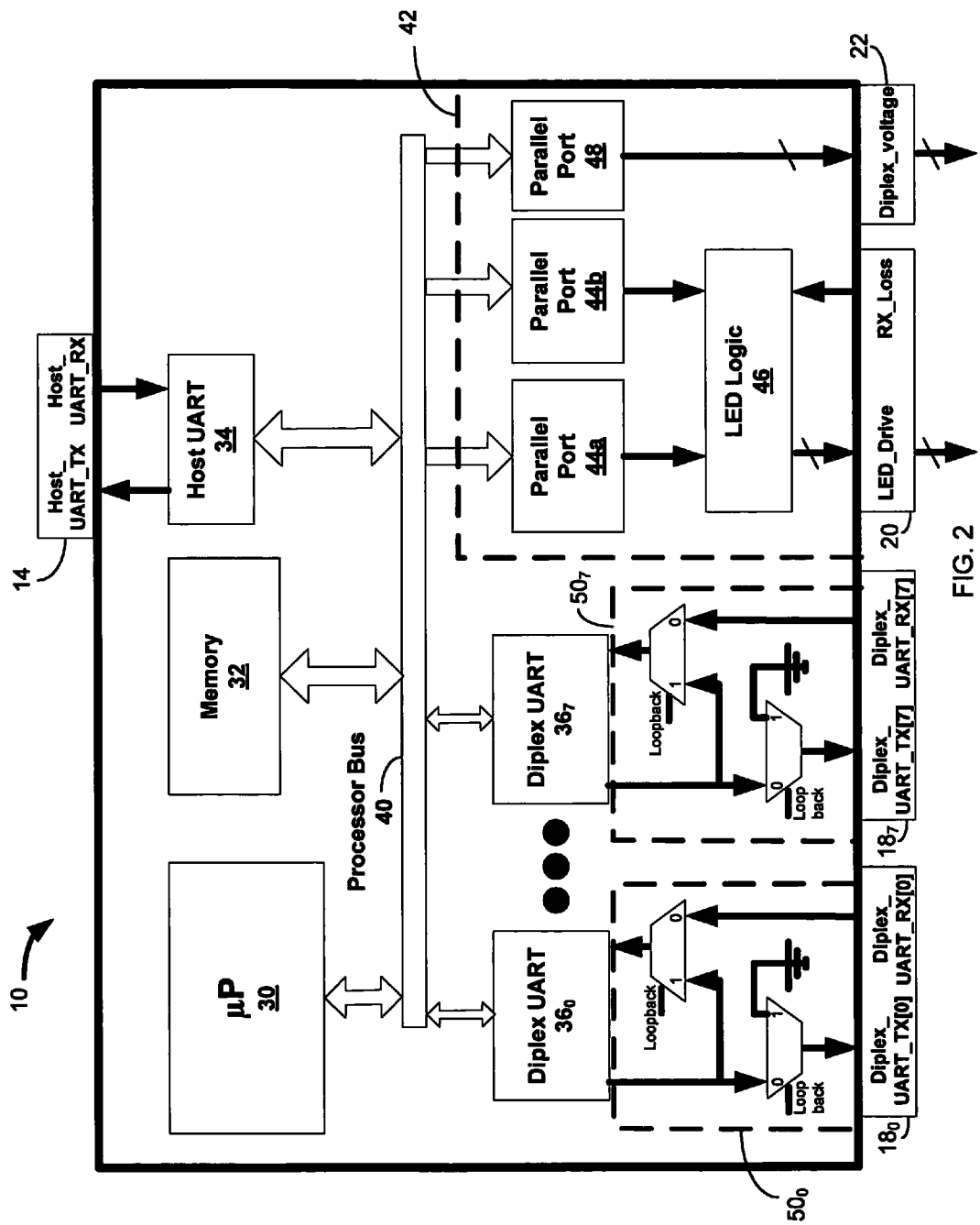
FIG. 2 is a schematic block diagram of the components of the diplex FPGA of the present invention.

FIG. 2 is a schematic block diagram of the diplex FPGA 10 of the present invention. As shown, the diplex FPGA 10 includes a microprocessor 30 and memory 32. In one embodiment of the invention, the microprocessor 30 is a NIOS® 16-bit processor available from Altera Corporation of San Jose, Calif. Memory 32 comprises a 5.5 Kb buffer having approximately 4 Kb dedicated to operating code for the processor, approximately 1 Kb for downstream communications and approximately 0.5 Kb for upstream communications. It will be understood that the memory size or configuration is not pertinent to the invention and that any suitable memory size and configuration may be utilized.

Diplex FPGA 10 further includes a host UART 34 for processing communications to and from the host 12 over host interface 14, and diplex UARTs $36_0$-$36_7$ for processing communications to and from the storage array 16 diplex interface ports $18_0$-$18_7$, respectively. Each diplex UART handles communications between the host 12 and an associated fibre channel loop in the storage array 16 through its associated diplex interface port. In one embodiment of the invention, the host UART 34 is configured to operate at 115,200 baud and the diplex UARTs $36_0$-$36_7$ are configured to operate at 9,600 baud in a first implementation and 19,200 baud in a second implementation. In this embodiment, each UART is preferably configured as a peripheral to the ALTERA® NIOS® processor using the ALTERA SOPC builder software product. It will be understood that any type of suitable processor and UART may be configured to operate in the manner described herein and that the speeds at which the communications are transmitted to and from the diplex FPGA may vary according to the specific implementation of the diplex FPGA.

As shown in FIG. 2, the host UART 34 transmits signals Host_UART_TX to the host over the transmit portion of the host interface 14 and receives signals Host_UART_RX from the host over the receive portion of the host interface 14. Likewise, diplex UART $36_0$ transmits signals Diplex_UART_TX[0] to its associated loop in the storage array 16 over the transmit portion of the diplex interface port $18_0$ and receives signals Diplex_UART_RX[0] from its associated loop in the storage array 16 over the receive portion of the diplex interface port $18_0$. Diplex UARTs $36_1$-$36_7$ operate similarly.

Diplex FPGA 10 also includes a register section 42 including parallel ports 44a and 44b, which communicate with LED logic 46 for outputting the LED drive signal over LED interface 20 and a parallel port 48 for outputting the diplex voltage select signal over diplex voltage select interface 22. The microprocessor 30 is coupled to each of the components of the diplex FPGA 10 by a processor bus 40. Each UART $36_0$-$36_7$ is coupled to its respective diplex interface port $18_0$-$18_7$ through a loopback device $60_0$-$60_7$, respectively. Loopback devices $50_0$-$50_7$ allow for diagnostic testing of the diplex FPGA 10. The configuration and operation of loopback devices are known in the art and will not be described herein.

In general, the operation of the diplex FPGA is controlled by the microprocessor 30. Microprocessor 30, in a "round robin" fashion, polls each of the UARTs in sequence to determine whether the particular polled UART has data to transmit, whether packets stored in the memory 32 are ready to be transmitted and whether UARTs to which packets are to be transmitted are available for transmission thereto. In one embodiment, the microprocessor 30 operates at 66 MHz and processes one byte of data at a time.

In a first iteration, microprocessor 30, beginning with, for example, the host UART 34, will determine if the host UART has transmitted a byte, or character, into the diplex FPGA, and whether a packet is ready to be transmitted to the host through the host UART 34. The microprocessor will then determine if a packet is ready to be transmitted to the storage array 16 through one of the diplex UARTs $36_0$-$36_7$ and then whether a first one of the diplex UARTs has transmitted a character into the diplex FPGA. In the next iteration, the microprocessor 30 again determines if the host UART has transmitted a character into the diplex FPGA, and whether a packet is ready to be transmitted to the host through the host UART 34. The microprocessor will then determine if a packet is ready to be transmitted to the storage array 16 through one of the diplex UARTs $36_0$-$36_7$ and then whether a next one of the diplex UARTs has transmitted a character into the diplex FPGA. This process is repeated until the microprocessor 30 has polled the host UART and every diplex UART and then the cycle is repeated.

Figure 3:
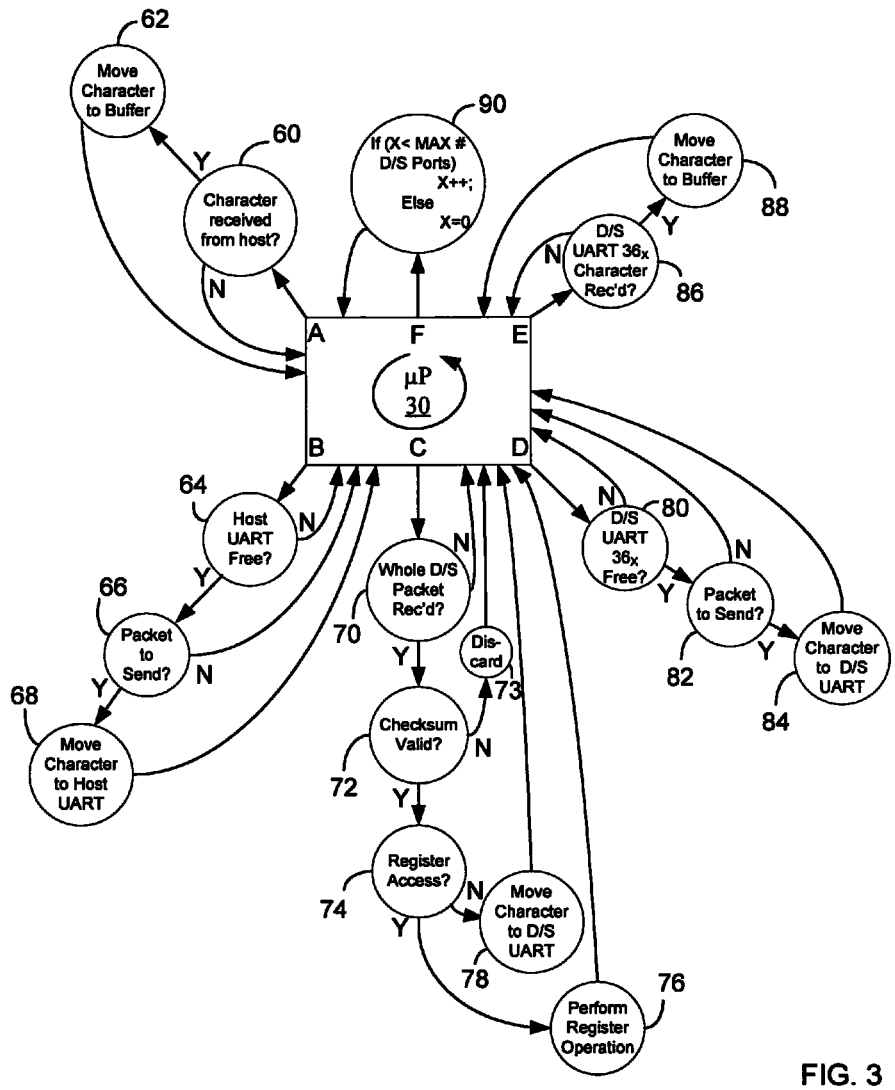
FIG. 3 is a flow diagram showing the operation performed by the microprocessor of the diplex FPGA of the present invention.

The specific operation of the diplex FPGA 10 is shown in the flow diagram of FIG. 3. As described above, microprocessor 30 cycles through a series of operations to direct the flow of data through the diplex FPGA 10. FIG. 3 shows each step taken by the microprocessor. In the figure, the letter "X" denotes the active one of the diplex UARTs for the current cycle of processing. For the purpose of this description, the diplex UARTs are identified as $36_x$. Beginning at Branch A, with X initiated to 0 to denote Diplex UART $36_0$, the microprocessor 30 determines whether a character has been received at the host UART 34 from the host 12, Step 60. If one has not, the microprocessor 30 continues to Branch B. In Step 60, if a character has been received at the host UART 34 from the host 12, the microprocessor 30 stores the character in the memory 32, Step 62. The microprocessor 30 then moves to Branch B.

In Branch B, the microprocessor 30 checks the status of the host UART 34 to determine whether it is free to transmit data to the host 12, Step 64. If the host UART is not free, the microprocessor moves to Branch C. If the host UART is free, Step 64, the microprocessor checks the memory 32 to determine if there is a whole packet in the memory 36 that is to be transmitted to the host 12 through the host UART 34, Step 66. As is described below, if a diplex UART has received a data packet to transmit to the host 12, the microprocessor 30 moves the packet into the memory 32 one character at a time. Therefore, a portion of a packet that is to be transmitted to the host through the host UART 34 may be present in the memory 32, but it will not be transmitted to the host UART 34 until the packet is determined to be complete in Step 66. If there are no complete packets to be transmitted to the host UART 34, the microprocessor moves to Branch C. If, in Step 66, a whole packet is detected in the memory 32, the microprocessor begins transmitting the packet one character at a time, Step 68. Since, as described herein, the microprocessor 30 cycles through each of the Branches A-F, four cycles would be required for a 4-byte packet to be transmitted to the host 12 through the host UART 34. The microprocessor 30 then moves to Branch C.

In Branch C, the microprocessor 30 checks the memory 32 to determine whether a whole packet that is to be transmitted from the host 12 through host UART 34 to a downstream device has been received, Step 70. Packets received and transmitted by the host UART 34, i.e., "downstream" packets, include a header byte which indicates whether a packet is to be directed to one of the diplex UARTS $36_0$-$36_7$, to the register section 42 or if the packet is an error packet. The second byte of such a downstream packet indicates the packet length. This enables the microprocessor to determine when a whole packet has been received in the memory 32 before it begins to transmit the characters of the packet to their destination. The last byte of the packet is a checksum byte which is used to validate the data in the packet.

If, in Step 70 the microprocessor determines that a whole packet has not been received, the microprocessor moves to Branch D. If a whole packet to be transmitted downstream is present in the memory 32, the microprocessor first validates the checksum of the packet, Step 72. If the checksum is not valid, meaning that an error is present in the packet, the packet is discarded, Step 73, and the microprocessor 30 moves to branch D. If the checksum is valid, the microprocessor determines, based on the header byte, if the packet is a register access request, Step 74. If the packet is a register access request from the host, the microprocessor 30 transmits the packet to perform the appropriate register operation, Step 76. As described above, in one example, the register access request could be directed to the parallel ports 44a and 44b for the purpose of sending instructions to the LED logic 46. The register access request also could be directed to the parallel port 48 for the purpose of sending a diplex voltage select signal to downstream storage devices coupled to the diplex FPGA 10 or to the diplex UARTs for the purpose of setting the baud rate at which the diplex UART will operate or to initiate a loopback operation. Once the register access request is transmitted to the appropriate register, the microprocessor 30 generates a response packet that will be transmitted to the host 12 over host UART 34 to confirm that the register access request was completed. The microprocessor 30 then moves to Branch D.

If the packet is not a register access request, Step 74, it is determined to be a diplex request, and it is transmitted to the downstream diplex UART to which it is addressed, Step 78. As is the case with the upstream packets, the downstream packets transmitted to the register section 42 and through the diplex UARTs are transmitted one character at a time. In the case of both register access requests and diplex requests, once the checksum operation has been performed, the header, length and checksum bytes are discarded before the packet is transmitted to its destination. The microprocessor 30 then moves to Branch D.

In Branch D, the microprocessor 30 determines if diplex UART $36_0$ is free to transmit a packet to the storage device 16, Step 80. If it is not free, the microprocessor moves to Branch E. If downstream diplex UART $36_0$ is free, the microprocessor determines whether a whole packet is present in the memory 32 that is to be transmitted through the diplex UART $36_0$, Step 82. If there is not, the microprocessor moves to Branch E. If there is a whole packet present in the memory 32 that is to be transmitted through diplex UART $36_0$, the microprocessor 30 moves the packet to the diplex UART $36_0$, one character at a time, Step 84. The microprocessor then moves to Branch E.

In Branch E, the microprocessor 30 determines if diplex UART $36_0$ has received characters from the storage device 16 that are to be transmitted to the host 12, Step 86. If not, the microprocessor moves to Branch F. If the diplex UART $36_0$ has received characters to transmit to the host 12, the microprocessor 30 moves the characters to the memory 32, one character at a time, Step 88. The microprocessor 30 then moves to Branch F.

In Branch F, "X" is incremented by one, Step 90, to indicate the next diplex UART which, in this example, is diplex UART $36_1$. If the active diplex UART upon entering Branch F is the highest numbered UART, i.e., diplex UART $36_7$ is this example, the letter X is reset to zero, thus indicating diplex UART $36_0$. The cycle including Branches A-F is then repeated, with diplex UART $36_1$ as the active diplex UART.

As described above then, since each diplex UART is active for only one of, in the case of an 8-port diplex FPGA, 8 cycles, the transmission of an 8 character, or byte, packet to the host UART 34 will take 64 cycles. However, the host UART 34 is able to transmit packets downstream in every cycle. This enables the diplex FPGA 10 to transmit data to, and receive data from the host 12 at 115,200 baud, while transmitting data to, and receiving data from the storage device 16 at much slower speeds, i.e. 9,600 baud or 19,200 baud.

During the operation of the microprocessor 30 through any of Branches A-F, if the microprocessor detects an error in the transmission of data through the diplex FPGA 10, the microprocessor will generate an error packet to be transmitted to the host 12. Examples of errors that will initiate the generation of an error packet include an overrun of characters on a diplex UART, a bad checksum on a packet and a register access request to a non-existent register.

While the operation of the microprocessor 30 has been described as beginning at Branch A and following the particular sequence of Branches A-F, the starting branch and the sequence may vary and are not pertinent to the invention. In other words, the cycle can begin at any of the branches A-F and the order of the branches followed may be different.

Accordingly, the present invention includes a diplex FPGA which fans a single, high-speed host UART channel to a number of diplex UART channels. The diplex FPGA includes a microprocessor that routs communications between the host UART 34 and a number of diplex UARTs to facilitate communication between the host 12 and the storage device 16 through a number of diplex ports 18.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, while the diplex FPGA has been described as providing communication between a host and a storage device, one or more of the diplex ports of the diplex FPGA may be coupled to the host UART of a further downstream diplex UART to provide a further fanning out of the original high baud-rate communication from the host. In such a case, the diplex UART of the upstream diplex FPGA to which the downstream diplex FPGA is coupled would send packets to the host UART of the downstream FPGA as if it were the host described above. Furthermore, while the diplex FPGA has been described as facilitating communications between a host and a storage device, the diplex FPGA may be utilized in any situation where fanout from a high-speed UART to multiple slower-speed UARTs is required. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for facilitating communication between an upstream device and a downstream device having a plurality of channels, the system comprising:
    an upstream universal asynchronous receiver transmitter (UART) coupled to receive communications from and transmit communications to the upstream device, and to transmit communications directly to and receive communications directly from a bus;
    a number N of downstream UARTs, each being coupled to one of the plurality of channels of the downstream device, for receiving communications from and transmitting communications to the downstream device, and being coupled to transmit communications directly to and receive communications directly from the bus;
    a processor for coordinating the transfer of communications between the upstream UART and the downstream UARTs; and
    a register portion, coupled to the bus, for communicating an LED drive signal;
    wherein communications between the upstream device and the upstream UART occur at a first rate and communications between the downstream UARTs and the downstream device occur at a second rate, the first rate being faster than the second rate.

2. The system of claim 1 further including a memory portion, wherein the upstream UART, the downstream UARTs, the processor and the memory portion are coupled to each other through a processor bus.

3. The system of claim 2 wherein the processor polls, in a round-robin fashion, the upstream UART and the N downstream UARTs to determine when any of the upstream UART and the N downstream UARTs have received a data communication from the upstream device and downstream device, respectively, to send to the downstream device and upstream device, respectively.

4. The system of claim 3 wherein, when the processor determines that a data communication has been input to one of the upstream UART and the downstream UARTs, it moves the data communication into the memory portion before passing the data communication to its destination.

5. The system of claim 4 wherein, if the data communication is from the upstream UART, the processor performs a data validity check on the data communication while it is in the memory portion.

6. The system of claim 4 wherein, in a first iteration of the round robin polling, the processor polls the upstream UART and a first of the N downstream UARTs to determine when the upstream UART has received a data communication from the upstream device and when the first downstream device has received a data communication from the downstream device.

7. The system of claim 6 wherein, in a second iteration of the round robin polling, the processor polls the upstream UART and a second of the Ndownstream UARTs to determine when the upstream UART has received a data communication from the upstream device and when the second downstream device has received a data communication from the downstream device; and
    wherein, in subsequent iterations, the processor polls the upstream UART and a next one of the N downstream UARTs to determine when the upstream UART has received a data communication from the upstream device and when the next downstream device has received a data communication from the downstream device, until returning to the first downstream UART.

8. The system of claim 7 wherein the processor moves a data communication into the memory portion one character of the data communication at a time, from the UART in which the data communication has been received, during a polling iteration that includes the UART in which the data communication has been received.

9. The system of claim 8 wherein the processor moves an entire data communication from a UART into the memory portion before transmitting the data communication to its destination.

10. The system of claim 9 wherein the processor transmits a data communication to its destination from the memory portion at a rate of one character per iteration of the round robin polling.

11. The system of claim 1 wherein the upstream device comprises a host and the downstream device comprises a data storage device.

12. The system of claim 10 wherein the upstream device comprises a host and the downstream device comprises a data storage device.

13. The system of claim 12 wherein the data communication comprises a multi-byte data packet and each character of the data communication is a byte of the data packet.

* * * * *